(12) United States Patent
Hallsten et al.

(10) Patent No.: US 10,124,291 B1
(45) Date of Patent: Nov. 13, 2018

(54) TRENCH SPANNING MODULES IN A BIOFILTER FLOOR ASSEMBLY

(71) Applicant: Hallsten Corporation, Sacramento, CA (US)

(72) Inventors: Jeffrey A. Hallsten, Sacramento, CA (US); Ronald Kuehne, Lincoln, CA (US); Gary Powell, Rocklin, CA (US)

(73) Assignee: Hallsten Corporation, Sacramento, CA (US)

( * ) Notice: Subject to any disclaimer, the term of this patent is extended or adjusted under 35 U.S.C. 154(b) by 261 days.

(21) Appl. No.: 15/051,603

(22) Filed: Feb. 23, 2016

(51) Int. Cl.
*B01D 53/85* (2006.01)
*E04B 5/02* (2006.01)
*E04B 5/48* (2006.01)
*E04B 5/43* (2006.01)
*E04F 15/02* (2006.01)

(52) U.S. Cl.
CPC ............. *B01D 53/85* (2013.01); *E04B 5/023* (2013.01); *E04B 5/43* (2013.01); *E04B 5/48* (2013.01); *E04F 15/02177* (2013.01)

(58) Field of Classification Search
CPC .............................. B01D 53/85; E04B 5/023
USPC ...................................................... 435/289.1
See application file for complete search history.

(56) References Cited

U.S. PATENT DOCUMENTS

| 6,255,102 B1 * | 7/2001 | Hallsten ................ B01D 24/24 |
| | | 435/299.1 |
| 7,422,895 B1 | 9/2008 | Hallsten |
| 7,713,732 B1 | 5/2010 | Hallsten |
| 2003/0089049 A1 * | 5/2003 | Scissom ............ E04F 15/02452 |
| | | 52/126.1 |

* cited by examiner

*Primary Examiner* — Gautam Prakash
*Assistant Examiner* — Lydia Edwards
(74) *Attorney, Agent, or Firm* — Thomas M. Freiburger (57) ABSTRACT

A modular biofiltration support system for a bed of organic filter medium, formed of a multiplicity of rectangular bed platform modules or floor tiles, provides for bridging across an air/gas supply trench which can be up to 36 inches or even 48 inches wide. The bridging sections, formed of a mix of recycled plastic materials in a high-pressure molding operation, interconnect with edges of the floor tile assemblies on each side of the trench, and also engage with one another at sides. Each module is a high strength beam.

9 Claims, 8 Drawing Sheets

TRENCH SPANNING MODULES IN A BIOFILTER FLOOR ASSEMBLY

BACKGROUND OF THE INVENTION

This invention is concerned with filtration of noxious odors and components out of gases such as given off by a sewage treatment facility. More specifically, the invention concerns a modular support system as described in U.S. Pat. No. 7,713,732, providing a raised biofiltration support bed, and including bridge modules that connect with the assembly of floor tile modules to provide a continuous floor, spanning across a trench through which air or gas is supplied.

Biological air pollution control has been used on an increasing basis in recent years to cleanse noxious and odorous gases, such as those emanating from a sewage treatment plant. Statutes mandate that those noxious/odorous gases be contained. The biological filtration systems or biofilters utilize a bed of stacked biofilter material such as compost, tree bark, peat, heather or soil, generally several feet deep. The containment gas from the sewage treatment plant or other sources is blown through the biofilter material in an upward direction. The material in the biofiltration bed provides an environment for a diverse culture of microorganisms, which can be seeded into the medium and which degrade the gaseous pollutants as they pass through the biofilter.

U.S. Pat. No. 7,713,732 describes a system of interlocking modular floor tiles with support legs that raise the floor above a hard surface below (such as concrete) providing a plenum below the modular floor through which air or gas is distributed. Earlier U.S. Pat. Nos. 7,422,895 and 6,255,102 also are concerned with such systems, all three of these patents being owned by the assignee of the current invention and all three being incorporated herein by reference in their entireties.

In many biofiltration systems in recent years, the air or gas (herein referred to as air) has been delivered not from an above-floor inlet tube or conduit such as shown in the above-referenced patents, but through an underfloor duct. In some instances this can take the form of a linear trench (with or without a pipe) formed in the concrete surface below the modular floor, or several such trenches parallel to one another. The trench creates a problem with continuity of the perforated floor system. Trenches can be 24 inches, 30 inches, 36 inches or even 48 inches in width. This requires an interruption in the modular, interconnected floor tile system and requires some form of structure to bridge across the trench and establish continuity and integrity for the filter bed floor structure.

The continuity problem has been addressed in some biofiltration bed systems with stainless steel bridging elements, which corrode in a short period of time due to the corrosive nature of the gases. Molded plastic bridging elements have been used as well, but not with adequate strength and durability and without interconnection to the biofiltration bed sections on each side of the trench, thus not providing adequate integrity of the raised floor system.

Accordingly, it is a primary objective of the invention to improve the integrity of a modular support system for biofiltration or for compost materials, with the support system including bridging modules spanning over one or more air delivery trenches, without compromising the integrity of the system.

SUMMARY OF THE INVENTION

A biofiltration floor according to the invention includes a series of bridging modules spanning a trench and providing continuity, high strength and load capacity, as well as secure connection with the floor tile assemblies on each side of the trench, with a secure structural connection between the floor tiles and the bridge members. The bridging modules are side by side, elongated in shape and alternating in orientation. Each bridge module is configured to engage in an interlocking way with the next adjacent bridge module, with half the length of the module having an overlapping lip at each of left and right, while the other half of the module's length has a ledge on which the lip of the adjacent bridge module rests. Adjacent modules are therefore retained together as to up/down deflection, to share load-bearing strength between modules, and to assure and maintain a level and uniform surface through the bridge modules.

Importantly, the bridging modules engage at their long ends securely with the assemblies of the floor tiles on both sides of the trench. In a preferred embodiment this is accomplished with hooked edges as described in the incorporated U.S. Pat. No. 7,713,732. That system and also U.S. Pat. No. 6,255,102 describe interlocking floor tile edges, each tile having two opposing edges with a bottom protruding with an upwardly inclined edge and the other two edges having a top lip with a downwardly inclined edge, so that these opposing inclined lips interlock when the modules are assembled side by side at end to end. Since it is preferred to install the bridging modules across the trench or trenches first in the biofiltration floor assembly, the ends of these bridging modules preferably have upwardly turned lips at both ends, so that the floor tiles, which are supported on legs, connect together with the bridging elements by downwardly turned lips on the floor tiles. This makes a secure connection with high integrity for the continuous floor surface. The lip orientations could be reversed, in the event a biofiltration floor system is designed in which the floor tile assemblies are to be made first, then the bridging elements installed, but this is not preferred.

The bridge modules in a preferred embodiment are formed by high-pressure molding of recycled plastics, preferably from multiple different polymers in small pieces. These are placed in the correct quantity in one component of a two-part mold, which is then pressed together with very high force. The result is a high-strength bridge module which is itself a structural beam having depending parallel webs and blocking between webs, so as to carry high load across the span.

The invention achieves a relatively inexpensive, recycled plastic bridge module for a biofiltration floor system which interlocks with the raised floor tile assemblies on both sides of a trench spanned by the bridge modules, and with adjacent bridge modules also interlocked with one another. These and other objects, advantages and features of the invention will be apparent from the following description of a preferred embodiment, considered along with the accompanying drawings.

DESCRIPTION OF PREFERRED EMBODIMENTS

Figure 1:
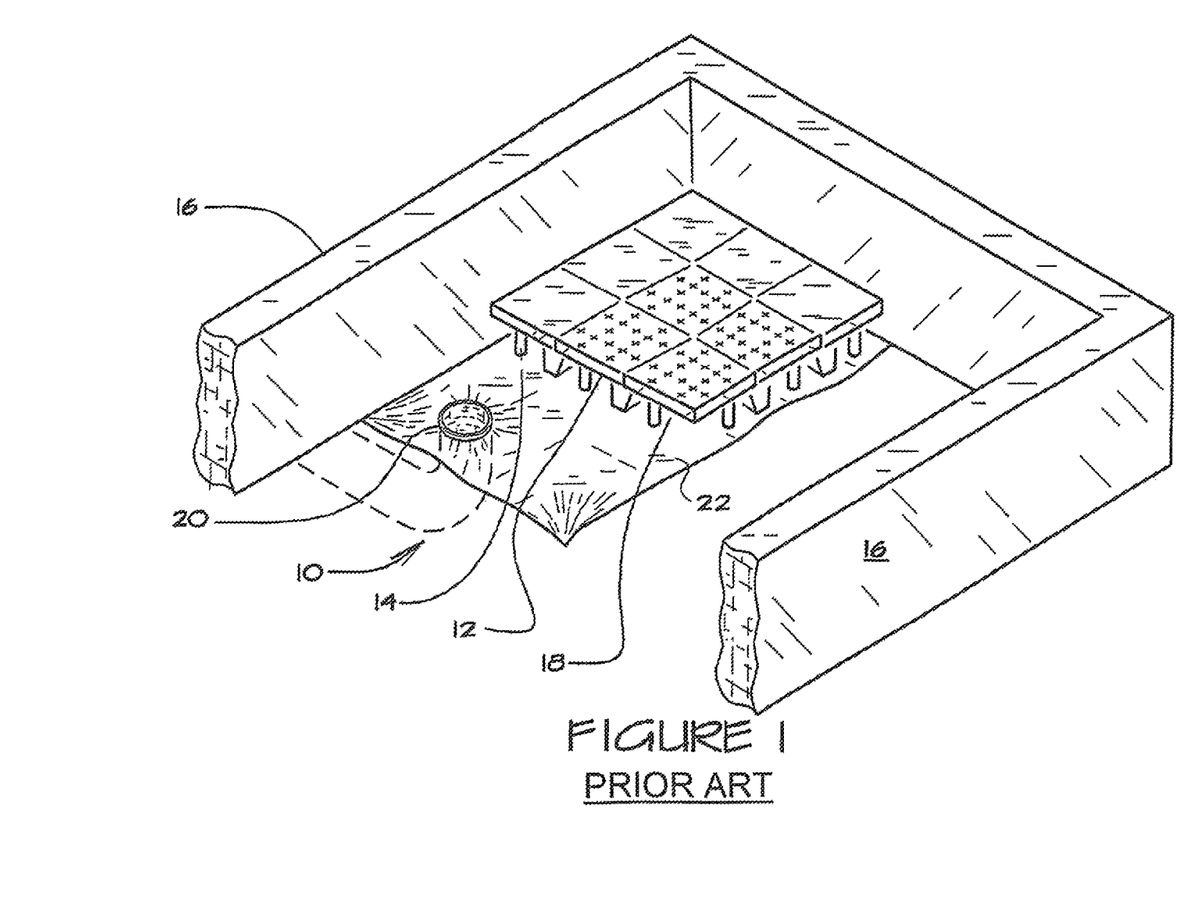
FIG. 1 is a perspective view showing a portion of a raised bed biofiltration floor system as in the prior art, to which the system of the invention is applied.
Figure 2:
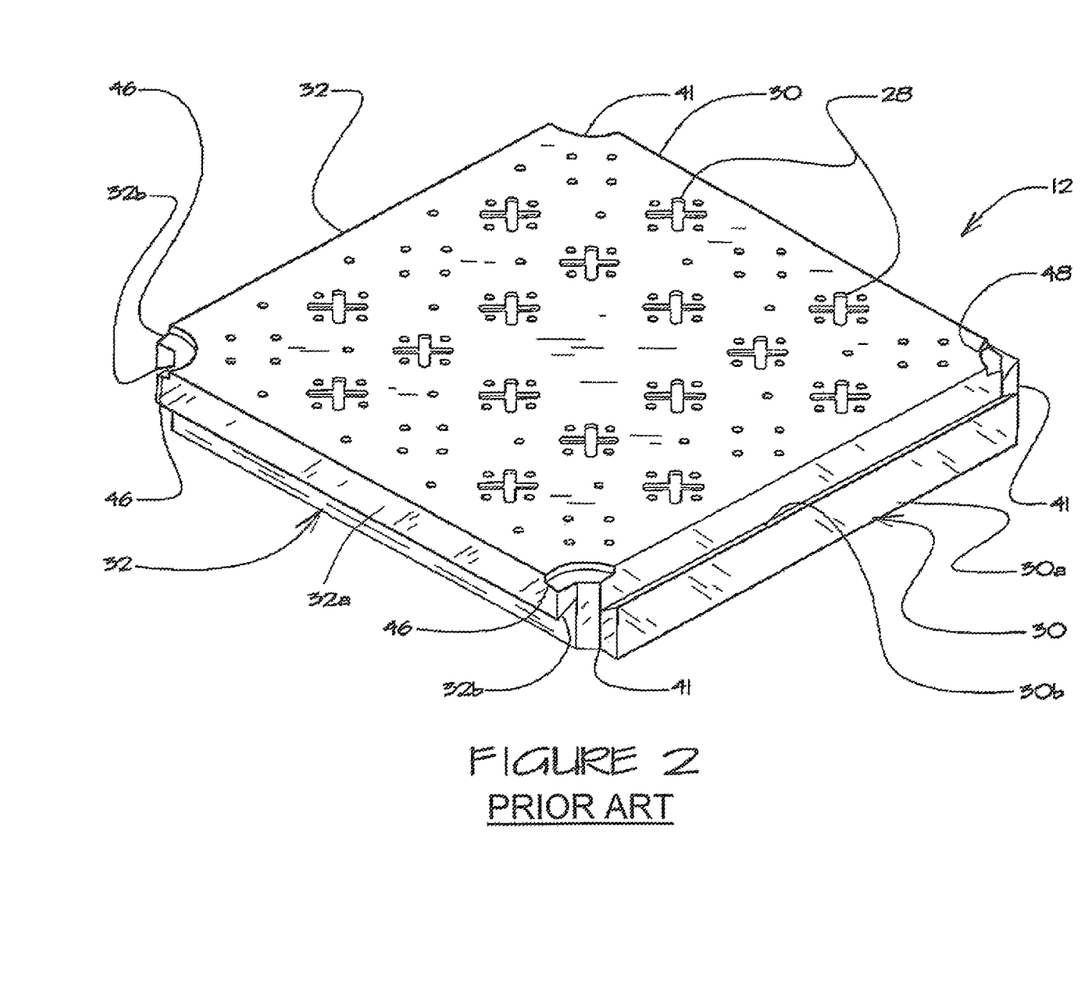
FIG. 2 is a perspective view showing a biofiltration floor module of a type to which the invention applies, also showing prior art.

In the drawings, FIGS. 1 and 2 are from incorporated U.S. Pat. No. 7,713,732. FIG. 1 shows, in a schematic view, a portion of a modular biofiltration medium support assembly 10, used to filter and treat noxious and odorous gases. The filter medium is not shown in the drawing. The raised floor support system could also be used to support a bed of composting material.

The modular system includes modular floor tiles, preferably square or rectangular (or another polygonal shape which can be assembled into a contiguous platform), supported by legs 14 and assembled side-by-side and end-to-end essentially as shown. The floor tiles or modules 12 can be assembled in an area where a wall 16 exists for this purpose, or they could form a free-standing assembly, with appropriate end members for closing the plenum of space 18 under the floor tiles at non-enclosed edges of the assembly. The '732 patent also shows such edge modules. If desired one or more sides of the assembly could be closed by a different means, such as soil or rubble piled up at edges to form edge closures that can be in the form of ramps.

This prior art view also shows that gases can be pumped into the plenum 18 beneath the floor tiles, via a subsurface inlet 20. In a biofiltration system gases are often noxious, odorous gases from a sewage treatment facility. These gases are also corrosive. The floor assembly 10 preferably is built on a hard surface (such as concrete), although in this prior art drawing a floor covering 22 is shown, preferably a plastic tarp that provides a seal, so that the system could be built on flat but unpaved ground if desired.

FIG. 2 shows a prior art floor tile module 12, such as shown in the '732 patent. FIG. 2 shows the top side of the floor tile and indicates a plurality of air openings 28 through which air gases pass when the biofiltration system is in use. The edges 30 and 32 of the floor tile are formed as explained in the '732 patent, with two edges 30 of the tile having a protruding lip 30*a* at the bottom side of the edge, forming an upwardly inclined surface 30*b*, and the other two edges 32 having an upper lip 32*a* with a downwardly inclined surface 32*b* which is configured and positioned complementarily to the inclined surface 30*b* so that adjacent tiles can be laid together and interengaged.

As explained in the '732 patent, the floor tiles are secured to strong load-supporting legs that can be used in selected numbers and which engage with the bottom side of the floor tiles and interlock the modules together at four-corner intersections via the configuration of the legs and a large plastic bolt that is screwed down into a threaded socket of the leg and draws the four tile modules corners down tightly onto the leg, drawing the tiles together at the corner.

Figure 3:
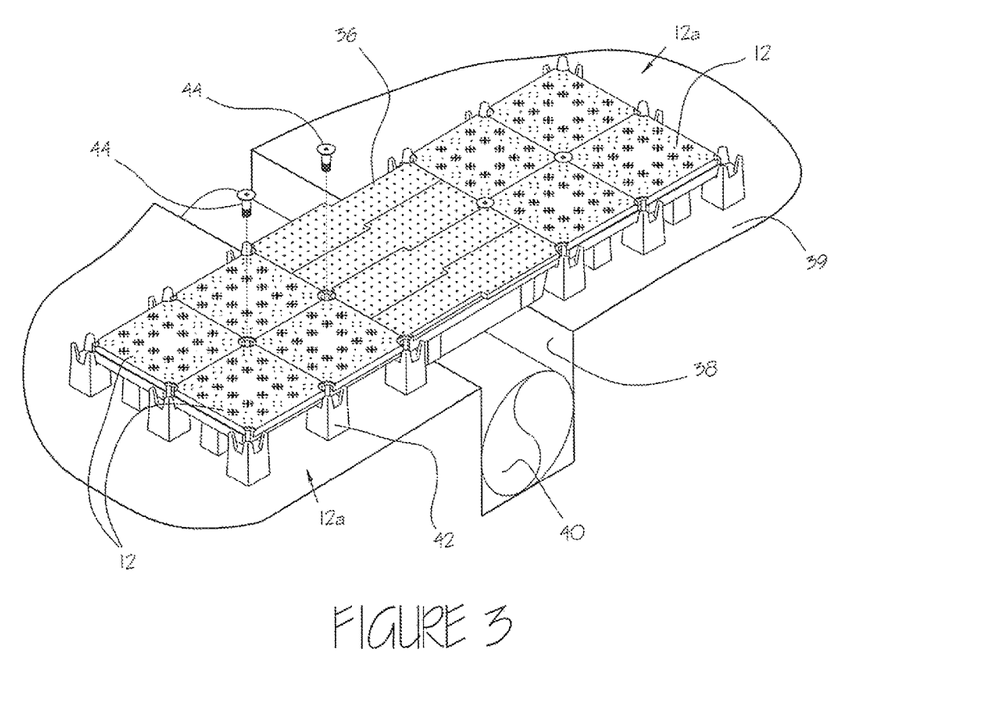
FIG. 3 is a perspective view showing interconnection of floor tiles of the kind shown in FIGS. 1 and 2, and including bridge modules spanning a trench and secured to the floor tiles on either side of the trench.

FIG. 3 is a view showing a system such as in the '732 patent but including bridging or spanning modules 36 according to the invention, connected to and interlocked with module assemblies 12*a* on both sides of a trench 38.

The trench 38, preferably formed in a concrete floor, may contain a pipe or conduit 40, or can simply deliver air (gas) via the open trench, to be distributed essentially evenly throughout the plenum beneath the biofiltration floor. The bridge modules 36 are interconnected side by side as shown, alternating in orientation and all modules 36 preferably being identical. Plus, they engage with another to form a unified bridging floor and they interconnect with the assemblies of tiles on each side of the trench, providing a continuous, high-integrity biofiltration floor. FIG. 3 also shows preferred forms of platform-supporting legs 42 (similar to those described in the '732 patent), and indicates assembly of plastic retention bolts 44 as mentioned above, at floor tile intersections and at floor tile/bridge corner intersections. A portion of each end of each module 38 rests on the concrete surface 39 adjacent to the sides of the trench 38, as further discussed below.

Figure 4:
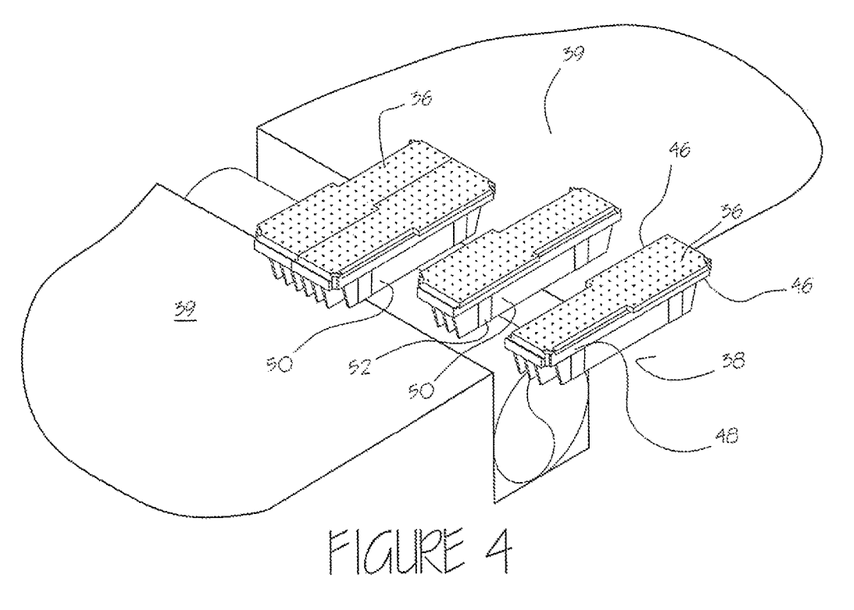
FIG. 4 is a perspective view showing bridge modules schematically indicated over a trench and in alternating orientations to show their interconnection.

FIG. 4 indicates assembly of the bridge modules 36 over the trench 38. As discussed above, the preferred assembly procedure is to initially place the bridging modules over the trench. They are assembled side by side, nested together with a form of interlocking. Interlocking is accomplished by overhanging lips 46 that extend through half the length of each module, and ledges 48 that are positioned on both sides of the remaining half of the module's length. These overhanging lips and ledges are without inclined surfaces so that the modules can easily be put together side by side and interengaged. As noted above, these interlocked bridging modules rest on the concrete surface 39. Each module is a beam with webs 50 that extend downwardly the full depth of the module. These parallel, spaced apart webs 50 include thickened sections 52 as indicated in FIG. 4 and also in the bottom view of FIG. 7. The sections 52 are for bearing against the concrete at the beginning and end of the span.

Figure 5:
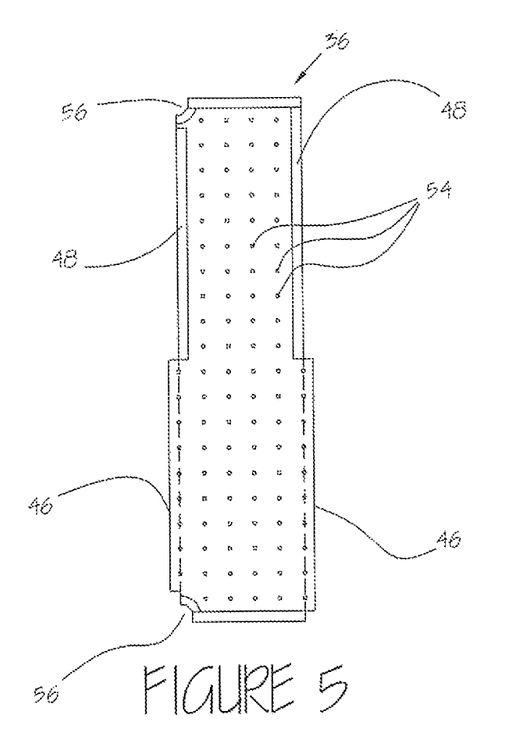
FIG. 5 is a top plan view of a bridge module.
Figure 6:
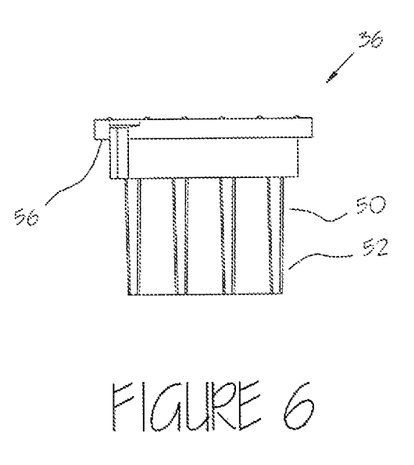
FIG. 6 is an end elevation view of a bridge module.
Figure 7:
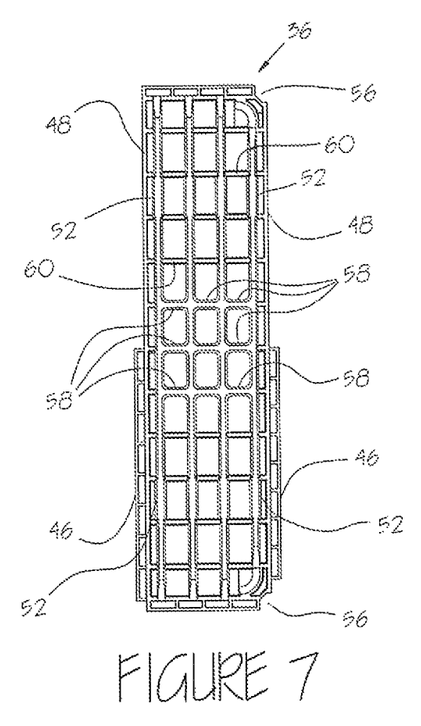
FIG. 7 is a bottom view of a bridge module.

FIGS. 5, 6 and 7 show top, end and bottom views of a bridging module 36. The overhanging lips 46 are shown at opposing sides of the module, through essentially one half of the length of the elongated module, and the ledges 48 of the other half of the module's length are also shown. The drawing indicates small bumps or nipples 54 which are rounded, essentially shallow dome shapes, integrally formed with the tile surface, preferably included so that a scraper blade of a machine will ride over these bumps rather than scraping and wearing at the flat surface of the floor.

FIG. 5 also shows that the elongated bridge module 36 is asymmetrical in one respect. The left side of the module as seen in FIG. 5 has arcuate indentations 56 in corners at one side but not the other. This is because the assembled modules are in pairs as shown in FIG. 3, with the width of a pair of modules being equal to the width of a single floor tile module 12. The side of each module that is without these arcuate indentations 56 (i.e. the right side as viewed in FIG. 5) simply mates with the same side of another bridge module, but in opposite orientation, thus making a pair of bridge modules, two pairs being seen in the partial floor illustration of FIG. 3. Thus, each pair of modules has four indented corners 56, each of which is used to connect with an intersection of tiles with similar indentations such as shown in FIG. 2. At each four-corner intersection, two floor tiles 12 and two bridge modules 36 (which could be considered two pairs of bridge modules 36) meet and are secured together to a support leg 42 using the plastic machine bolts 44. All corners are securely tied down to the leg, which is configured in the '732 patent with upper projections that help draw the four corners together.

FIG. 7, a bottom plan view, also shows the thickened web portions 52 and the fact that the webs are foreshortened slightly at each end where they terminate adjacent to the arcuate indentations 56. Also shown in FIG. 7 is deep blocking 58 that extends across between webs preferably at three locations as shown, through the full depth of the webs for increased load bearing strength to avoid web buckling. In a preferred embodiment shallower blocking is included at 60, at multiple locations through the length of the module. These blocking elements do not extend down through the full depth due to the need for distribution of incoming air, which is to be dispersed to left and right from the trench 38 for distribution among the floor tile assemblies 12*a*.

Figure 8:
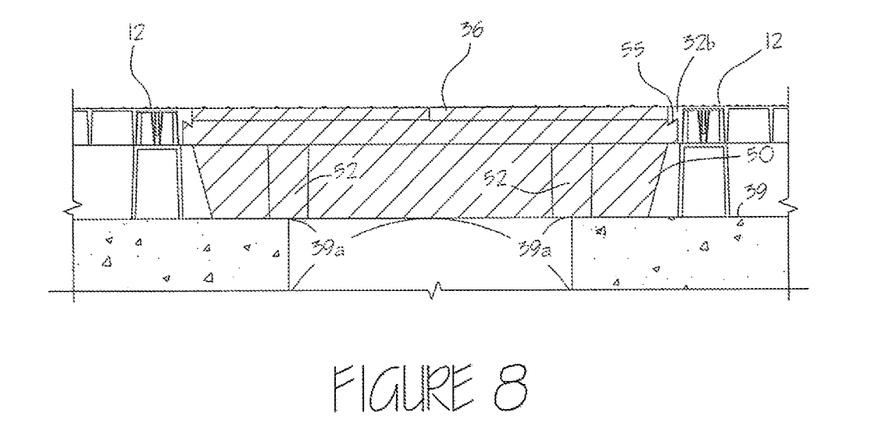
FIG. 8 is an elevational cross section taken through a trench and indicating a bridging or spanning module spanning across the width of the trench and interconnected with floor tile assemblies on both sides of the trench.

FIG. 8 is a cross sectional elevation view through the trench 38, showing a bridge module 36 spanning across the trench. The drawing shows one of the webs 50, and thickened portions 52 of the web straddling the edge 39*a* of the concrete floor where the trench begins, at both sides. The thickened sections 52 of the web straddle this corner or at least overlap it at both locations, and this is the case with all four webs in the version shown in these drawings.

FIG. 8 also shows the trench spanning or bridging module 36 interlocked with a floor tile module 12 at both ends of the elongated spanning module. The module has an upturned edge or lip 55, which is engaged by a downturned lip 32*b* of the floor tile 12.

The bridging or spanning modules 36 preferably are about four feet in length. In a preferred form these modules are about 12 inches in depth, thus to match the height of the module floor tile assembly 12*a* as supported by the legs 42. In one preferred form such a bridging module can support a loading of at least 25,000 pounds distributed on a one square foot area across a 30 inch span. Wider trenches can also be accommodated, if the bridge modules are beefed up in strength, as with additional webs. Note that in the case of a trench that is narrower, such as 24 inches, a considerably higher load can be placed on the bridging modules without failure. High loads are experienced from equipment which operates on the biofiltration floor to load and manipulate filter media.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. In a modular, raised floor assembly for supporting organic material and having perforations through the floor for air flow, including a multiplicity of floor tiles secured together by engaged edges and supported on legs from a hard floor below, the improvement comprising:

a system of bridging modules spanning across an air ducting trench in the hard surface below and connected to edges of floor tile assembly sections on both sides of the trench, each bridging module being an elongated beam module, longer than and differently shaped than the floor tiles, having an upper side as a floor surface flush with top surfaces of the floor tiles of the floor tile assembly sections on each side of the trench, the beam module having a plurality of elongated strengthening webs extending essentially through the length of the beam and integral with the floor surface, extending down from the floor surface in parallel, spaced apart relationship through the width of the beam module, each beam module having ends with angled hooked lips each engaged with a complementarily shaped lip on an edge of a floor tile of the floor tile assembly section at each side of the trench such that the beam modules are hooked together with the floor tile assembly sections at both sides of the trench, in interlocked relationship, thus forming the connection of the bridging modules to floor tiles, and each bridging modules having two sides, with sides of modules in contact with sides of adjacent modules and interlocked to maintain floor surfaces of adjacent bridging modules together at a common level.

2. The assembly of claim 1, wherein each bridging module has a width which is half the width of a floor tile of the floor tile assembly.

3. The assembly of claim 2, wherein each bridging module has a length which is essentially equal to the length of two assembled floor tiles.

4. The assembly of claim 1, wherein each bridging module has full-height blocking between webs of the module only in a middle portion of the bridging module, to allow air from the trench to flow outwardly between webs to a space beneath the floor tile assembly on each side of the trench.

5. The assembly of claim 1, wherein the bridging modules have a load-supporting capacity of about 25,000 pounds distributed on a 12 inch by 12 inch area, across a 30-inch unsupported span.

6. The assembly of claim 5, wherein the bridging modules have a length of about 48 inches and span across a trench having a width of about 30 inches.

7. The assembly of claim 5, wherein the bridging modules have a length of about 48 inches and span across a trench having a width of about 36 inches.

8. The assembly of claim 5, wherein the bridging modules have a length of about 48 inches and span across a trench having a width of about 24 inches.

9. The assembly of claim 1, wherein the bridging modules are formed of a mix of a plurality of different recycled polymers cut into small pieces and compressed together in a high-pressure mold to form the module.

* * * * *